United States Patent Office 3,832,157
Patented Aug. 27, 1974

3,832,157
METHOD OF PRODUCING REFRACTORY METALS AND REFRACTORY METAL COMPOUNDS IN POWDER FORM
Elis Kjell Ake Svanstrom, Nynashamn, Sweden, assignors to Rederiaktiebolaget Nordstjernan, Nynashamn, Sweden
No Drawing. Original application May 21, 1971, Ser. No. 145,922, now Patent No. 3,723,601. Divided and this application Oct. 30, 1972, Ser. No. 302,117
Int. Cl. C22b 39/00, 51/00, 57/00
U.S. Cl. 75—.5 BB   1 Claim

ABSTRACT OF THE DISCLOSURE

Refractory metals are produced using a gaseous halide process in which the process is accelerated by employing crystallization seeds in the reaction.

---

This is a division of application Ser. No. 145,922, filed Mal 21, 1971, now U.S. Pat. No. 3,723,601.

The present invention relates to a method of producing a powder of one of the refractory metals V, Nb, Ta, Cr, Mo, W and Re or a mixture of two or more of these metals. The invention also relates to the production of carbides, borides or nitrides of one of the metals Ti, Zr, Hf, V, Nb, Ta, Cr, Mo and W, or a mixture of two or more of these metals from the halide(s) of the metals in the gaseous phase.

Thus, broadly speaking, the present invention relates to powder preparation. The grain size of powders of certain metals and metal compounds can thus be controlled, as the powder is prepared from the halides of the corresponding metals in the gaseous phase. In certain cases also the shape or form of the grains can be influenced.

Powders of these refractory metals or metal compounds are usually prepared in batches. Thus, for instance, tungsten powder is prepared from a batch of tungsten oxide by reducing the oxide with hydrogen gas passing through the furnace. Titanium carbide can also be prepared by reacting titanium dioxide and carbon in batches. In commercial practice, a grain size of more than 1 μm. is generally obtained. However, there is a need of powders of a smaller grain size. According to the literature, processes are known for the production of, for instance, tungsten carbide powder having a smaller grain size, but the production costs are high and, therefore, the processes lack commercial interest.

Other methods for the preparation of such powders include those starting from metal halides in the gaseous phase. Thus, the metal powder may be prepared by reacting a metal halide in the gaseous phase with hydrogen gas; metal carbides may be prepared by carrying out the reaction with hydrogen gas in the presence of a gas-containing carbon; while metal borides or nitrides can be prepared in analogous manner. When such processes are used for the preparation of powder, the powder is often so finely divided that, for this reason, it has limited use.

Some additional difficulties occur in gas phase reactions between the hydrogen gas employed and metal halides. It has often turned out to be very difficult to obtain a major amount of powder freely precipitated in the reactor. The metal or the metal compounds tend to deposit on the walls of the reactor or on objects in the reactor, which deposit results in the formation of films or flakes, which gradually come loose and fall down in the powder formed. In this way, the composition of the product becomes non-uniform and the product cannot be used directly. An inferior yield is achieved in the reaction and the reactor must now and then be stopped for removal of the coatings. This precipitation on the reactor walls can be inhibited by raising the reactor temperature, but the result of this is a powder that is still more finely divided.

In several cases, the reaction in the gas phase is very slow and only very small amounts of powder are obtained.

This is, for instance, the case in preparing carbides of the metals titanium, zirconium and hafnium. In such cases, it has been necessary to resort to reduction under the influence of a hydrogen plasma. This process is, however, expensive and provides extremely fine powder.

These difficulties are substantially eliminated by employing the present process, and, furthermore, the reaction in the gas phase is accelerated and a powder is obtained instead of deposits on the reactor walls. The grain size of the powder can moreover be influenced by the present process. The present process is characterized in that the reaction is carried out in the presence of crystallization seeds or seed-forming substances.

It is known to promote the crystallization in solutions by addition of seeds. Sugar solutions can, for instance, be brought to crystallization by adding a fine sugar powder to a saturated sugar solution. By means of continued evaporation, crystallization of uniform sugar crystals is obtained.

Another example of known art is production of titanium dioxide from sulphate solution by addition of colloidal crystallization seeds influencing the reaction, the yield and the size and shape of the crystals.

According to the present invention, it has now been surprisingly observed that it is possible to influence such reactions in the gaseous phase whereby powders of the metals V, Nb, Ta, Cr, Mo, W and Re or powders of carbides, borides or nitrides of the metals Ti, Zr, Hf, V, Nb, Ta, Cr, Mo and W are obtained by addition of crystallization seeds. Apparently, the reactions take place on the surface of these seeds, which results in a more rapid reaction. Slow reactions can in this way be accelerated to proceed more completely. In cases where previously only deposits on the reactor walls substantially could be obtained, the reactions can be brought to proceed more completely by the addition of crystallization seeds or seed-forming substances, before the reactants reach the reactor walls. By the present process, it is also possible to control the grain size of the formed product by adjusting the amount of crystallization seeds or seed-forming substances relative to the amount of reactants. Coarser grains are obtained at less relative amounts of crystallization seeds and, on the other hand, a larger relative amount of crystallization seeds provides a finer grain size. In certain cases, it has also appeared to be possible to influence the shape or form of the grains, for instance, in the preparation of titanium carbide, which can be obtained either in the form of round grains or of well-shaped crystals with plane surfaces.

The crystallization seeds can be added to the reactants or to the reactor in the form of a fine powder of the material to be prepared, i.e. powder of the metals or the metal compounds. It is also possible to use powders of some other material than that to be prepared in the cases where such contamination with foreign material is of no practical importance. Crystallization seeds can also be achieved by adding a substance which will form crystallization seeds during the reaction. These substances are referred to herein as seed-forming substances.

Titanium carbide can be prepared by heating a mixture of titanium tetrachloride, hydrogen gas and a hydrocarbon (e.g. methane) to reaction temperature. This reaction takes place slowly and only minor amounts of titanium carbide are received in the form of powder. If small amounts of tungsten hexachloride or molybdenum pentachloride are added to the reaction as seed-forming substances, these materials react rapidly forming metal or metal carbide in the form of fine grains, on the surface of which the reaction to titanium carbide takes place very rapidly. If tungsten and molybdenum are not desired as contaminants in the titanium carbide powder, the reaction can still be brought to continue more rapidly by adding titanium tetraiodide, which substance is more easily disintegrated to metal than titanium tetrachloride and which then serves as a seed-forming substance, i.e. forms crystallization seeds of titanium.

It is, however, not necessary to add crystallization seed substances or seed-forming ones as such, but it is also possible to form or initiate such seeds in the reaction mixture. One can, for instance, add hydrogen as a seed-initiating gas preheated to reaction temperature in small but effective amounts, the addition taking place continuously or by pulses to the reaction so that locally conditions for a more rapid reaction to grains of metal or metal compunds are achieved, which grains serve as crystallization seeds. It is also possible to bring locally the reaction mixture to considerably increased temperature to initiate the formation of seeds, for instance, by electrical discharges or sparks so that a more rapid reaction to grains of metal or metal compound takes place locally, the grains also in this case serving as crystallization seeds, especially at the production of metal carbide powder. As an example of such a carbonaceous compound, carbon tetrachloride can be mentioned.

The invention is described more closely in the following examples.

EXAMPLE 1

A mixture of $TiCl_4$, $CH_4$, $H_2$ and $WCl_6$ in the molar ratio 1:1:5:0.009 was introduced in gas phase into a reaction chamber which was maintained at a temperature of 1300° C. From the titanium carbide formed at the reaction 92% were obtained in the form of a powder having a total carbon content of 20.03%, of which free carbon was 0.50%.

When the reaction was carried out under the same conditions with the same gas mixture which, however, did not contain a small but effective amount of $WCl_6$ as seed-forming substance, about 5% of the titanium carbide was obtained in the form of a powder.

EXAMPLE 2

The test in Example 1 was repeated but, instead of $WCl_6$, a small but effective amount of $MoCl_5$ was used as seed-forming substance. 70% of the titanium carbide formed was obtained in the form of a powder. The powder contained totally 20.20% carbon, of which 0.55% was free carbon.

EXAMPLE 3

A gas mixture of $TiCl_4$, $CH_4$, $H_2$ and $CCl_4$ in a molar 1:1:10:0.01 was reacted in a reactor at a temperature of 1300° C. Titanium carbide was formed, of which 57% was obtained in the form of a powder. In this case, the power, however, was well-defined crystals different from the powders obtained in the previous examples, the crystals having quite another form in comparison with the grains of the powder obtained when $WCl_6$ and $MoCl_5$ were used as seed-forming substances.

EXAMPLE 4

A gas mixture of $TiCl_4$, $C_6H_6$, $H_2$ and $WCl_6$ in the molar ratio 1:1:10:0.009 was reacted in a reaction chamber at 1300° C. Titanium carbide was formed, of which 70% was obtained in the form of a powder having a total carbon content of 19.64%; the content of free carbon being 0.79%.

EXAMPLE 5

A mixture of $TiCl_4$, $NH_3$, $H_2$ and $WCl_6$ is provided in a molar ratio of 1:1:2:0.01 which is introduced as a gaseous phase into the reaction chamber as in Example 1 at a temperature of about 1300° C. to form titanium nitride. The small but effective amount of $WCl_6$ is employed as the seed-forming substance.

EXAMPLE 6

A gaseous mixture of $ZrCl_4$, $BCl_3$, $H_2$ and $MoCl_5$ is introduced in the molar ratio of 1:2:8:0.05 into the reaction chamber at a temperature of about 1400° C. to form zirconium boride, the small but effective amount of molybdenum pentachloride being used as the seed-forming material.

EXAMPLE 7

Tantalum nitride is produced by feeding a gaseous mixture of $TaCl_5$, $NH_3$, $H_2$ and $WCl_6$ in the molar ratio of 1:1:3:0.02 into the reaction chamber at a temperature of about 1200° C., the small but effective amount of $WCl_6$ being employed as the seed-forming substance.

The foregoing examples illustrate the use of reactants selected from the group consisting of carbon-containing, boron-containing and nitrogen-containing materials in producing refractory metal compounds in powder form.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claim.

What is claimed is:

1. In a process of producing a powdered metal product selected from the group consisting of V, Nb, Ta, Cr, Mo, W and Re by the reduction of a gaseous halide of said metal in a reaction chamber, the improvement wherein said process is accelerated in the reaction chamber by means of a seed-initiating reaction, which comprise injecting into the gaseous halide a small but effective amount of preheated hydrogen heated to at least the reaction temperature while feeding the gaseous halide into the reaction chamber.

References Cited

UNITED STATES PATENTS

| | | | |
|---|---|---|---|
| 3,062,638 | 11/1962 | Culbertson et al. | 75—.5 BB |
| 3,177,067 | 4/1965 | Nichols | 75—.5 BB |
| 3,211,548 | 10/1965 | Scheller et al. | 75—.5 BB |
| 3,234,007 | 2/1966 | Blocher et al. | 75—.4 BB |
| 3,341,320 | 9/1967 | Smiley | 75—.5 BB |

WAYLAND W. STALLARD, Primary Examiner

U.S. Cl. X.R.

75—84.4, 84.5